April 14, 1964      A. A. TINAJERO ETAL      3,128,970
VEHICLE SOFT LANDING SYSTEM
Filed May 28, 1962     3 Sheets-Sheet 1

INVENTORS
ANIBAL A. TINAJERO
ALBERT SOPP

April 14, 1964 A. A. TINAJERO ETAL 3,128,970
VEHICLE SOFT LANDING SYSTEM
Filed May 28, 1962 3 Sheets-Sheet 2
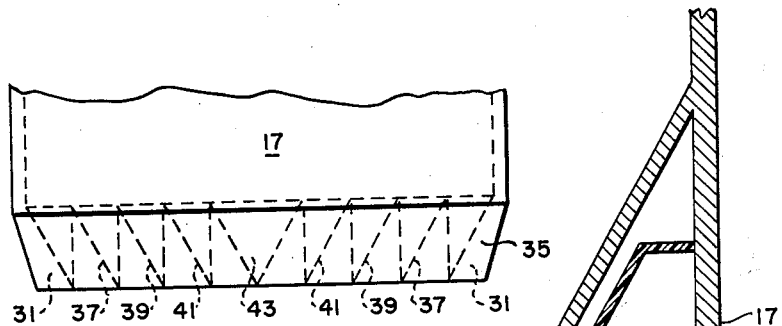
FIG. 5.
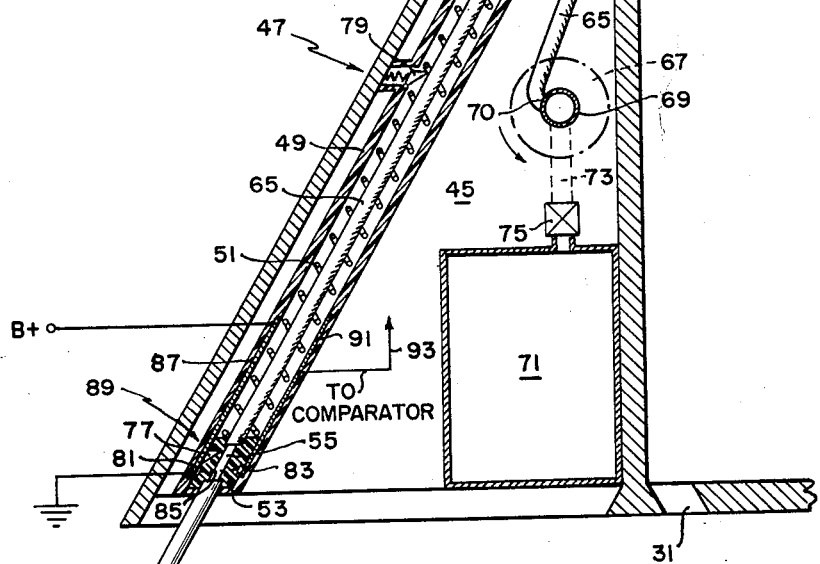
FIG. 2.
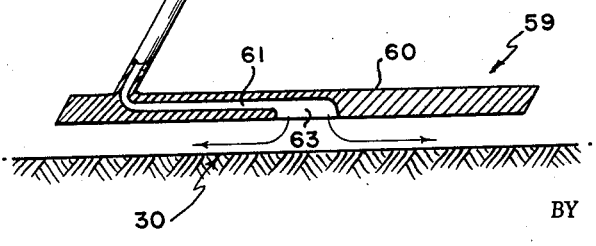
INVENTORS
ANIBAL A. TINAJERO
ALBERT SOPP
BY
ATTORNEY United States Patent Office 3,128,970
Patented Apr. 14, 1964

3,128,970
VEHICLE SOFT LANDING SYSTEM
Anibal A. Tinajero, Arlington, Va., and Albert Sopp, Montgomery County, Md., assignors to the United States of America as represented by the Secretary of the Navy
Filed May 28, 1962, Ser. No. 198,381
17 Claims. (Cl. 244—100)
(Granted under Title 35, U.S. Code (1952), sec. 266)

The invention described herein may be manufactured and used by or for the Government of the United States of America for governmental purposes without the payment of any royalties thereon or therefor.

This invention relates to space vehicles, and more particularly, relates to a soft landing system for a space vehicle wherein the landing of the vehicle on a heavenly body is controlled and carried out by what is known as "ground effect."

Of the many problems which arise in the non-destructive or "soft" landing of a space vehicle, two important problems concern the avoidance of too great a fuel expenditure and of too much heat being generated from rocket engine blast in the immediate vicinity of the body of the space vehicle. Corollary with these problems are those of controlling the selection of a safe landing area and of making the actual landing with a minimum of danger from surprise or the possible miscalculation of what might once have appeared to be a safe landing area.

Accordingly, it is among the objects of the present invention to provide a space vehicle capable of making a safe "soft" landing; to provide a space vehicle which may be landed softly without danger of having its body or parts thereof oveheated due to too close, concentrated, and long an exposure to rocket engine blast in the proximity of a landing surface; to provide a soft landing system for a space vehicle utilizing the principles of ground effect to minimize the danger of miscalculation or surprise in the selection of a suitable landing area; to provide a soft landing control system responsive to ground effect conditions in an area being considered for landing of a space vehicle.

Among the features of the present invention is the provision of automatically causing the space vehicle to be lifted off before touching down if a landing area is surprisingly unsuitable or undesirable.

These and other objects and features of the present invention will be better understood by referring to the accompanying drawings in which like numerals are used to represent like parts and in which FIG. 1 is a side view of an embodiment of a space vehicle according to the invention during soft landing maneuver, the vehicle including several ground effect landing units;

FIG. 2 is a modified cross sectional view of an embodiment of an extensible ground effect landing unit according to the invention;

FIG. 5 is a diagrammatic view of the telescoped plug of FIG. 4;

Figure 1:
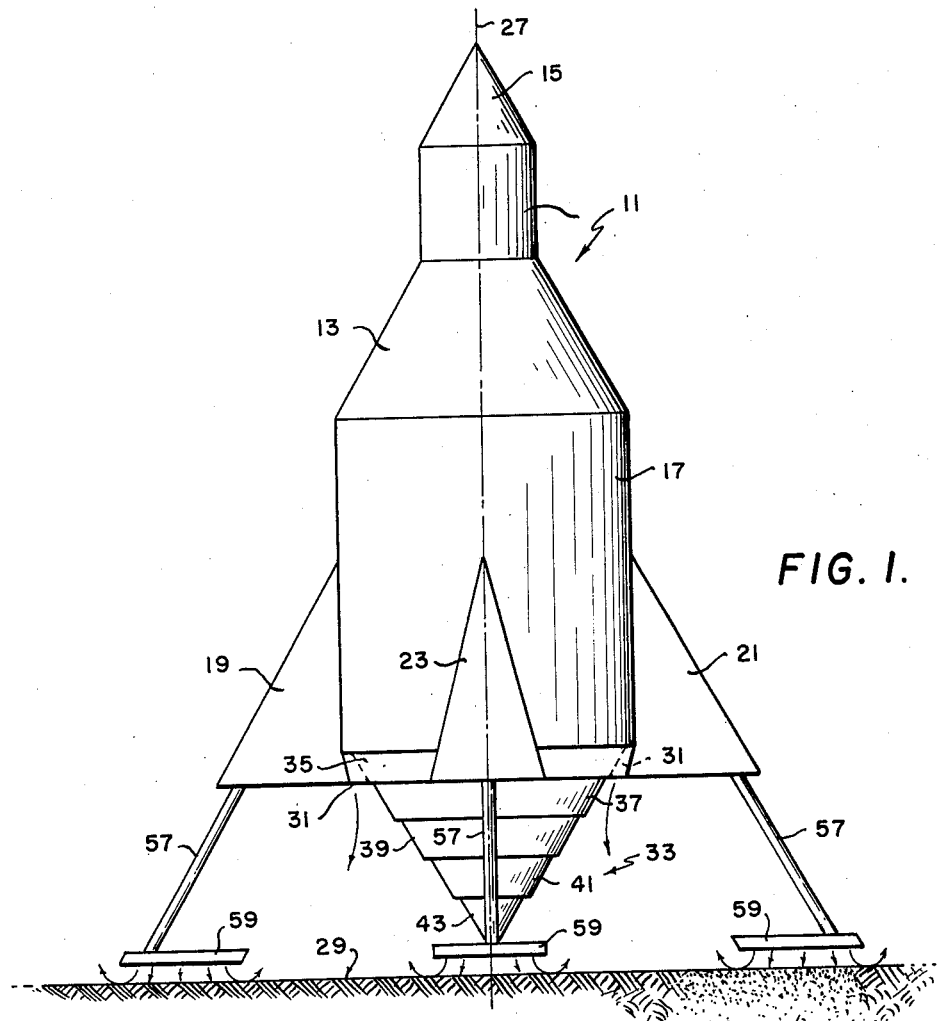

Referring to FIG. 1, a space vehicle 11 having a unitary body 13 generally circular in cross section has a nose section 15 of conventional construction which may be fitted out to house automatic control equipment or a human habitant; and a fuel section 17 located aft thereof and having a considerably larger diameter than that of the nose section 15.

Four identical hollow fins 19, 21, 23 and 25 each triangular in longitudinal and transverse cross section are each rigidly mounted to the outside of the fuel section 17 in a quadrant thereof about the longitudinal axis 27 of the vehicle 11 so that the pair of fins 19, 21, and the pair of fins 23, 25 are respectively diametrically opposing.

A surface of a heavenly body on which a landing of the vehicle 11 is being contemplated is indicated at 29.

Figure 4:
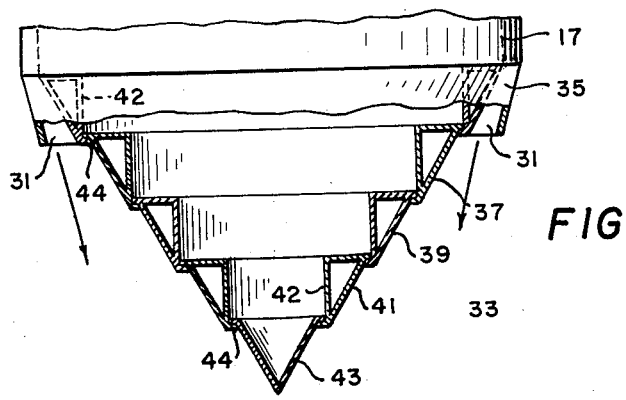
FIG. 4 is a modified view in longitudinal across section of the telescoping plug means of the space vehicle according to the invention.

As shown in FIG. 4, at the aft end of the body 13 is an annular rocket exhaust nozzle 31 having a longitudinally aftward tapering telescoping center plug 33 generally conical in overall shape. The plug 33 dissipates over its surface the heat of the rocket exhaust. Although according to this invention any number of telescoping sections may be used in the plug nozzle 33, the plug 33 being shown formed of four heat-dissipating frustums 35, 37, 39, and 41 respectively, each having a cylindrical interior hollow portion 42. A right conical tip section 43 forms the extreme section. Each of the sections is of the same thickness along the longitudinal axis 27. At operating temperatures of the rocket exhaust, the extreme diameter of the tip section 43 is sufficiently smaller than that of the inside diameter of adjacent frustum section 41 so that it may slide into the hollow cylindrical confines of the section 41. In a similar manner, at operating temperatures of rocket exhaust, the section 41 may slide into section 39, section 39 into section 37, and section 37 into section 35. Section 35 is located in any suitable fixed mounting interiorly of the plane of the annular nozzle 31 so that as shown in FIG. 5 when all of the sections have telescoped longitudinally inwardly toward section 35 no part of the plug nozzle 33 projects rearwardly of the plane of the annular nozzle 31. Any suitable means, such as a flange or shoulder 44 may be located at the broadest portion of each of said sections to prevent the sections from parting when extended; and, if desired, any suitable means may be used to positively displace the sections rearwardly of the annular nozzle 31 to place the sections in their extended position shown in FIG. 1.

The hollow confines of each of the identical fins 19, 21, 23 and 25 respectively, one of which is illustrated in FIG. 2, form a tetrahedronal compartment 45 in which there is mounted a ground effect unit 47. The ground effect units 47 mounted in the tetrahedronal compartments 45 are identical, and for the sake of convenience, only one of the identical units 47, shown in FIG. 2, need be described.

The ground effect unit 47 comprises a cylindrical housing 49 made of insulating material, and in addition, preferably self-lubricating, such as polytetrafluoroethylene. The housing 47 is rigidly mounted in the compartment 45 so that its walls are parallel to the leading edge of the fin. A compression spring 51 shown in its extended position is located inside the cylindrical housing 49 and is positioned therein against a shoulder 52 to exert a yieldingly downwardly urging force against a piston 53 slidable up and down in the cylindrical housing 49.

The piston 53 has a longitudinal aperture 55 extending therethrough, and is made of any suitable non-conducting material, preferably self-lubricating material such as polytetrafluoroethylene. A hollow tube 57 is rigidly fixed to the bottom of the piston 53 so that its hollow portion is in fluidtight registration with the aperture 55. A ground effect producing means in the form of a plate 59 is rigidly mounted to the bottom end of the shaft 59 so that the plate is parallel to the annular nozzle 31. The plate 59 is generally triangular in its flat dimensions and of a shape complementary to that of the large triangular open end of the compartment 45 of the fin.

As shown in FIG. 2, the plate 59 meets the tube 57 at a point of the triangular plate 59 eccentric of the plate's central portion 60. The plate is hollowed out to form an aperture 61 extending laterally therethrough so that the upper end of the aperture 61 is in registration with the hollow portion of the shaft 57 and so that the lower opening of the aperture 61 forms a nozzle 63 centrally in the bottom of the triangular plate 59. The offset mounting of the plate 59 makes possible the mounting of the cylindrical housing 49 very close to the leading edge of the fin. If an even closer position of the cylindrical housing is desired, the housing and piston may be made triangular in cross section so that a very close fit is obtained in the compartment 45. With this arrangement, for a given leading edge angle of the fin, the plate 59 when extended to the position shown in FIG. 2 is at a maximum radial distance from the longitudinal axis 27 without it being necessary to have the cylindrical housing 49 protrude into the wall of the fuel section 17. Moreover, when retracted, the plate 59 tightly fits into the open end of the compartment 45 providing a more compact in-flight vehicle structure.

A flexible tube 65 made of any suitable fluid-tight material is fluid-tightly connected to the upper end of the piston 53 so that its hollow portion is in registration with the aperture 55 of the piston. The flexible tubing 65 is led through the upper open end of the cylindrical housing 49 to a reel 67 spring biased in any suitable manner to maintain slight tension on the tubing 65 so that when the piston is caused to travel upwardly in the cylindrical housing 49, the flexible tubing 65 is wound round the reel 67.

The reel 67 rotates with a hollow shaft 69 having an aperture 70 therein. The end of the flexible tubing 65 is fluid-tightly connected to the hollow shaft 69 so that its hollow portion is in fluid-tight register with the aperture 70 in the hollow shaft 69. A tank 71 containing gas at high pressure supplies the gas to the flexible tube 65 via a conduit 73 connected fluid-tightly to the shaft 69 by means of any suitable rotary seal so that the gas flows through the tubing 65, aperture 55, the hollow tube 57, aperture 61 for discharge at high velocity from the nozzle 63 in the plate 59. The discharged gas forms a gas "cushion" at pressure higher than that of a medium surrounding the plate 59 when the plate 59 is in close proximity to the surface 29 in accordance with known ground effect principles.

A remote controlled valve 75 of any suitable construction in the conduit 73 controls the flow of gas to the plate 59. The gas may be stored in the tank 71 in liquid state.

In order to lock the ground effect plate 59 into its retracted position, a recess 77 is located in the side of the piston 53 to receive a remote-controlled spring biased detent 79 mounted in the upper part of the walls of the cylindrical housing 49. As shown in FIG. 1, when extended, the plate 59 of each of the fins extends downwardly therefrom equidistantly from the longitudinal axis 27 and all of the plates are in a horizontal plane passing just below the tip section 43 of the telescoping plug nozzle 33.

The piston 53 has embedded in opposite sides thereof respectively electrical contacts 81 and 83 which are connected to each other by a lead 85 embedded in the piston. The contact 81 is in sliding engagement with a resistance 87 which is embedded longitudinally in the lower portion of the inside of the wall of the cylindrical housing 49 and having an exposed portion for engagement with sliding contact 81. The upper end of the resistance 87 is connected to a source of bias voltage indicated as B+, and the lower end of the resistance is connected to ground such as the frame of the vehicle.

The cooperation of the contact 81 with the resistance 87 forms a potentiometer 89, the output voltage of which passes through the contact 81, lead 85 to the contact 83. The contact 83 is in sliding engagement with a conductor 91 mounted longitudinally on the other side of the inside of cylindrical housing 49. A lead 93 is electrically connected to the conductor 91 so that, as indicated in legend in the FIG. 2, the output of the potentiometer 89 may be fed to a comparator.

With this arrangement, upward displacement of the piston 53 from its lowermost position in the cylindrical housing 49 produces a correspondingly increased voltage output from the potentiometer which in turn provides a measure of the amount of lift force acting on the ground effect plate 59.

Any suitable comparison and control means may be used to provide for the controlling of the maneuvering of the space vehicle during landing. In the embodiment shown in the accompanying drawings, the comparison and control means are responsive to sensing information received from the potentiometers 89 located in each of the respective fins 19, 21, 23 and 25. The operation to be carried out is that when there is a predetermined amount of imbalance of lifting force between the ground effect plates associated with opposing pairs of fins 19, 21 or 23, 25, the space vehicle 11 will be automatically caused to lift off before actually coming into intimate contact with the surface 29.

Figure 3:
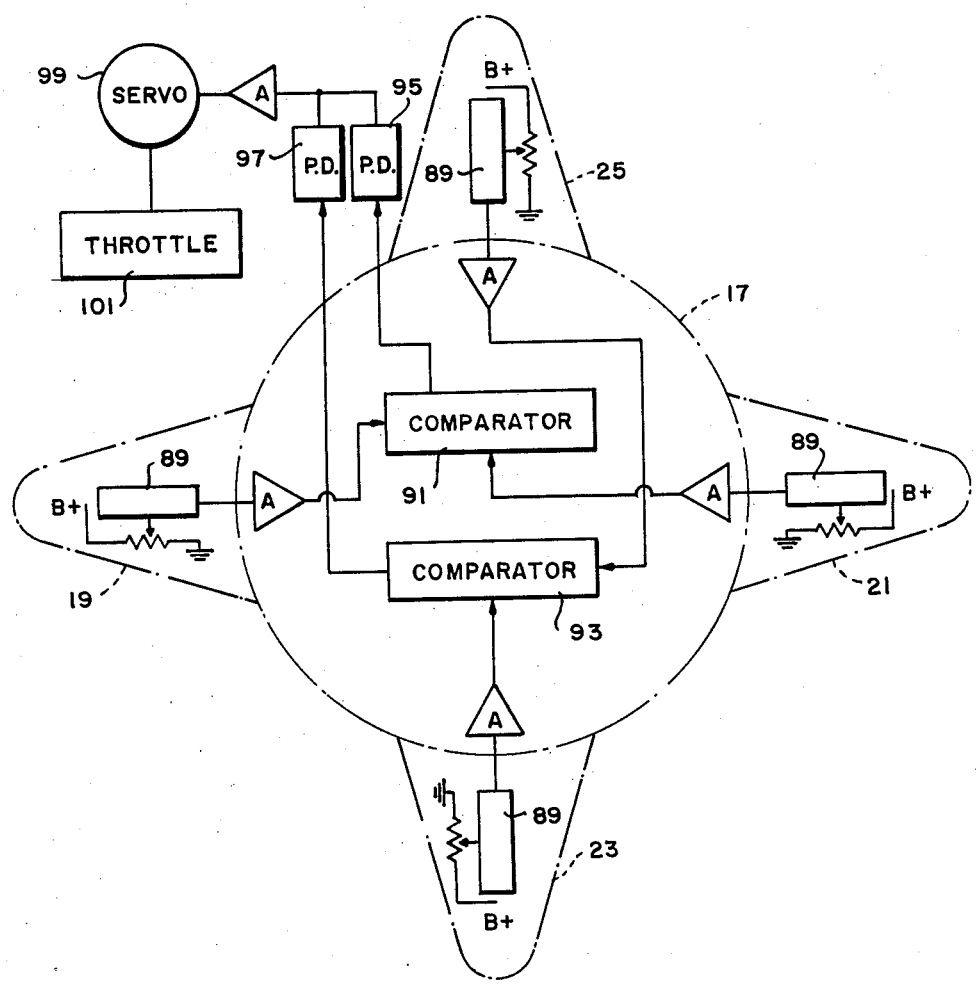
FIG. 3 is a modified schematic block diagram of an embodiment of a sensing and control system according to the invention.

An embodiment of such comparison and control means is schematically shown in FIG. 3, and comprises in each of the fins the aforementioned potentiometer 89, the output voltage of which increases in proportion to the amount of lift produced by the plate 59. Of course, the amount of voltage on each of the potentiometers 89 increases in proportion to the amount of excess upward lift force produced by its associated ground effect plate over the downward bias force acting thereon by virtue of each of the compression springs 51 acting on its associated piston 53.

The voltage output of each of the potentiometers 89 may be suitably amplified; and the outputs of the potentiometers 89 of opposing fin pair 19, 21 are fed to a comparator 91. Similarly, the outputs of the potentiometers 89 of the opposing fin pair 23, 25 are fed to a comparator 93. When the potentiometer outputs of the ground effect units of the opposing fin pairs 19, 21; 21, 23 are equal, the output of each of the comparators 91 and 93 is zero.

The respective outputs of the comparators 91 and 93 are fed separately to peak detectors 95 and 97 respectively so that when the difference between the opposing potentiometer outputs reach a predetermined level in either comparator 91 or 93, either associated peak detector 95 or 97 will produce an output control voltage. This output control voltage may be suitably amplified to drive a servo 99 which in turn actuates a throttle 101 for controlling the thrust from the main rocket through the annular nozzle 31. Thus, when there is a predetermined imbalance between the forces of one of an opposing fin pair 19, 21 or 23, 25, or both simultaneously, the throttle 101 may be actuated by the servo 99 to increase the thrust of the rocket, thereby lifting the space vehicle 11 from the vicinity of the surface 29.

According to the operating principles of the present invention, the space vehicle 11 is remotely or pilot retro-controlled to an upward-heading direction as shown in FIG. 1 in the vicinity of the surface 29. The ground effect plates 59 of the respective fins are extended from their closely fitting positions in each of the respective fins by the releasing of the detent 79 in any suitable remote-controlled manner.

Of course, the rocket thrust through the nozzle 31 is controlled in any suitable well known manner to bring the vehicle 11 in close proximity to the surface 29 as shown in FIG. 1; and as the vehicle approaches the surface 29 in each of the fins the remote controlled valve 75 is opened to permit the flow of gas at high pressure from the tank 71 via the flexible conduit 65, the aperture 61, the hollow portion of the tube 57, to the ground effect plate 59.

Each of the ground effect plates 59 is sufficiently laterally distant from the blast of the nozzle 31 so as to be beyond appreciable deleterious heat effects therefrom; and the blast will have no appreciable effect on the gas cushions produced under each of the platform. If the surface 29 under all of the extended ground effect plates is flat, horizontal, and solid enough so as not to be eaten away by the high pressure gas discharged from the nozzle 63 of each of the ground effect plates, then the output of the potentiometers will be equal, and no appreciable voltage output will reach the servo 99. Thus, the throttle 101 will not be actuated to lift off the vehicle 11.

The amount of thrust from the rocket nozzle 31 is then reduced so that the resultant gravitational weight of the vehicle 11 is sufficient to overcome lifting forces produced by gas confined beneath the ground effect plates, thereby causing ground effect plates to reach intimate contact with the surface 29. The vehicle 11 is only very slightly supported thereby, but their radially outward locations serve to increase the stability of the vehicle 11 during the let down maneuver.

As the vehicle 11 is brought closer to the surface 29, the blast from the rocket nozzle 31 exerts greater upward pressure on the telescoping plug nozzle 33 so that when the tip section 43 thereof is just about to touch the surface 29, the sections begin telescoping. As shown in FIGS. 4 and 5, this telescoping continues until each of the plug nozzle sections has telescoped upwardly into the adjacent larger section so the finally, as shown in FIG. 5, all of the telescoped sections have receded into the largest section 35 located interiorly of the plane of the nozzle 31. When the vehicle 11 is in the position shown in FIG. 5, the weight of the vehicle has pushed upward the plate 59 of each fin so that it retracts into its original close fitting position in the compartment 45.

The aforementioned telescoping of the plug nozzle sections takes place even though the thrust of the rocket motor is gradually reduced in the letdown maneuver because of the greater confinement of the exhaust gases beneath the vehicle. When the vehicle has reached the position shown in FIG. 5 very close to the surface 29, say a matter of several inches or less, its rocket motor may be cut off, the remaining drop of the vehicle being only very slight.

However, should the surface 20 on which a letdown of the vehicle 11 is intended be of too great an uneven character, or if the nature of the surface is such that it is easily eaten away by the action of the air discharged under some of the ground effect platforms, then the ground effect-produced lift on at least one plate of a ground effect unit will, at least momentarily or longer, be greater or less than that of the plate associated with the opposing ground effect. For example, as shown in FIG. 1, one of the ground effect plates 59 is shown during the landing maneuver positioned over a stippled portion 103 of the surface 29, the portion 103 in this situation representing matter which is more easily eaten away by the action of the gas discharged from the nozzle 63 of the plate 59. Thus the lift force on the plate 59 over the surface portion 99 produced by ground effect will, at least momentarily or longer, be appreciably less than that on the opposing plate because the plate 59 over surface portion 99 will never be as close to that surface as the opposing plate will to a solid surface.

Therefore, the piston 53 of the plate 59 over a solid surface will be displaced further upward in its cylindrical housing 49 than will the piston 53 associated with the plate over eroding surface 103, thus producing a difference in the outputs of the potentiometers 89 of the opposing fin pair 19 and 21, in the comparator 91. If the error voltage output of the comparator 91 is high enough to exceed the voltage level at which the peak detector 95 becomes conductive, the output of the peak detector 95 will be amplified to drive the servo 99 actuating the throttle 101 thereby increasing the thrust of the main rocket engine of the vehicle to cause lift off.

With this arrangement the vehicle 11 will be lifted off before it has a chance to settle into intimate physical contact with a surface which has been found to be unsuitable even though previously it may have appeared to be suitable from a greater distance. Moreover, the unsuitable condition of the surface 29 is sensed early enough in the landing maneuver so that the vehicle will be lifted off before it can settle to a tilted or toppled position on the surface—a situation which would add greatly to the danger of lift off.

Of course, if one of the ground effect plates is disposed over a rise in the surface 29 during the landing maneuver, the same result as described previously with the erodable portion 103 would take place because of an imbalance of lifting forces between the opposing ground effect plates of a pair.

If desired, an additional source of high pressure fluid may be provided for feeding fluid into the lower part of the cylindrical housing 49 beneath the lowermost travel of the piston 53 to force the piston 53 back into the cylindrical housing 49 as a positive manner of retracting the ground effect plate 59. This might be desirable in those situations where there are to be no further attempts at landing, the vehicle 11 being permanently lifted off after the last attempt.

In the embodiment of the invention as shown in the drawings, when the vehicle 11 has fully landed on the surface 29, the weight of the vehicle will cause the ground effect plates to be retracted into their respective housings and locked therein by means of the action of the spring biased detent 79 so that when the vehicle is lifted off for its return flight, the plates will be in their retracted positions for in-flight operation.

For very heavy space vehicles, it may be desirable to utilize yieldable hydraulic means for extending the ground effect plates instead of the spring 51. For example, in the case where hydraulic means might be so used, the cylindrical housing 49 would be made fluid-tight and the fluid fed thereinto above the piston 53 from any suitable source of hydraulic fluid. After so extending the ground effect plates, a metered orifice could by means of any suitable valve arrangement be placed in fluid coupling with the fluid in the upper portion of the interior of the cylindrical housing 49 so that fluid would escape therethrough responsively to the amount of lifting force produced by the action of gas discharge beneath the ground effect plate causing upward displacement of piston 53. The resulting differences between lifting forces on ground effect plate of opposing ground effect units would then be utilized as previously explained to control the maneuvering of the vehicle 11.

Obviously many modifications and variations of the present invention are possible in the light of the above teachings. It is therefore to be understood that within the scope of the appended claims the invention may be practiced otherwise than as specifically described.

What is claimed is:

1. A rocket propelled vehicle capable of making a soft landing comprising:
   (a) a hollow body for said vehicle;
   (b) a rocket engine mounted interiorly of said hollow body;
   (c) an annular discharge nozzle for directing the flow of exhaust from said rocket engine longitudinally rearwardly of said body;
   (d) and telescoping plug means mounted centrally of said annular nozzle for further directing the flow of exhaust and dissipating heat from said rocket engine exhaust, said telescoping plug means comprising a longitudinally telescoping cascade of discrete tapered bodies of decreasing size protruding aftwardly of said vehicle, each of said bodies having a cavity for receiving the adjacent smaller body thereinto;

(e) whereby when said vehicle is brought nozzle-first into the close proximity of a surface, the action of the ground effect produced by the exhaust causes said plug means to telescope to form a plug located entirely within the interior confines of said vehicle body thereby permitting a flush landing of said vehicle on its nozzle.

2. The invention as defined according to claim 1 but further characterized by the aftermost of said discrete tapered bodies comprising a truncated right conical section and each of the remaining bodies comprising a frustum the cavity of which is a cylindrical.

3. A rocket propelled vehicle capable of making a soft landing comprising:
  (a) a body for said vehicle having an annular nozzle at the aft end thereof;
  (b) a plurality of diametrically opposed pairs of hollow fins mounted on the sides of said body, the aftermost tips of said fins being open and in approximately the same plane as that of said annular nozzle;
  (c) a ground effect unit mounted in each of said hollow fins, each of said ground effect units comprising:
    (1) a ground effect plate having a discharge nozzle located in the underside thereof, said ground effect plate having a shape complementary to that of the open end of said fin;
    (2) reciprocating means located in said fin and connected to said ground effect plate for moving said plate to a retracted position within said fin and to an extended position aft of said fin;
    (3) means in said fin yieldingly urging said ground effect plate to an extended position;
    (4) a source of high pressure gas located in said vehicle;
    (5) conduit means connecting said high pressure gas source for discharge through the nozzle of said ground effect plate;
  (d) sensing means located in each of said fins for sensing the amount of displacement of said reciprocating means produced by lift on each of said ground effect plates;
  (e) comparison means responsive to the output of each pair of opposed sensing means for producing an output proportional to the difference between the respective outputs of said opposed sensing means;
  (f) actuatable means for increasing the rocket thrust responsive to a predetermined output level of any of said comparison means; and
  (g) normally extended telescoping plug means mounted centrally of said annular nozzle and retractible, under the action of ground effect produced by said nozzle when in close proximity to a surface, to a position flush with the annular nozzle if the output of said comparison means remains below said predetermined level during the vehicle landing operation.

4. The invention as defined according to claim 3 but further characterized by said reciprocating means comprising a cylindrical housing outwardly canted to the longitudinal axis of said vehicle, a piston having a longitudinal aperture extending therethrough and reciprocatingly movable in said housing, and a hollow shaft rigidly connecting said ground effect plate to said piston for fluid passage therebetween.

5. The invention as defined according to claim 3 but further characterized by said conduit means comprising a reel having a hollow shaft with an aperture therein and spring biased for rotation in one direction, a rotary seal for said hollow shaft, a conduit fluidly connecting said high pressure gas source to said rotary seal, and a flexible tube mounted in fluid-tight registration with the aperture in said shaft and with the aperture in said piston.

6. The invention as defined according to claim 4 but further characterized by each of said fins having a leading edge canted outwardly of the longitudinal axis of said vehicle, and the longitudinal axis of the cylindrical housing therein being parallel to the fin leading edge.

7. The invention as defined according to claim 4 but further characterized by said piston and said cylindrical housing comprising self-lubricating electrically insulated material.

8. The invention as defined according to claim 7 but further characterized by said sensing means comprising an electrically resistive element mounted on the lower portion of the inside surface of the wall of the cylindrical housing, a source of bias voltage connected to one end of said electrically resistive element and a source of reference potential connected to the other end of said resistive element, a first electrical contact mounted on said piston for sliding contact with said resistive element, a second electrical contact mounted on said piston, electrically conducting means mounted in said piston connecting said first and second electrical contacts thereof, an electrical conductor mounted longitudinally on the inside wall of said cylindrical housing, said second electrical contact being in sliding engagement with said electrical conductor, and conductive means connected to said electrical conductor for feeding the output thereof to said comparison means.

9. The invention as defined according to claim 3 but further characterized by said sensing means comprising a potentiometer the output of which is variable responsive to the amount of displacement of said ground effect plate under the action of ground effect produced thereby.

10. A rocket propelled vehicle capable of making a soft landing comprising:
  (a) a hollow body for said vehicle;
  (b) a rocket engine mounted interiorly of said hollow body;
  (c) an annular discharge nozzle for directing the flow of exhaust from said rocket engine longitudinally rearwardly of said body;
  (d) telescoping plug means mounted centrally of said annular nozzle for further directing in a heat dissipative manner the flow of exhaust from said rocket engine, said telescoping plug means comprising a longitudinally telescoping cascade of discrete tapered bodies of decreasing size protruding aftwardly of said vehicle, each of said discrete bodies having a cavity therein for receiving the adjacent aftwardly positioned smaller discrete body thereinto;
  (e) a plurality of opposed pairs of radially outwardly extensible and retractible ground effect producing means mounted on said body, each of said ground effect producing means when extended being approximately in the same plane as that of the tip of the extended telescoping plug of said annular nozzle for providing additional landing stability for said vehicle;
  (f) whereby when said vehicle is brought nozzle-first into close proximity to a surface, the action of ground effect produced by the discharge of rocket exhaust causes said plug to telescope inwardly to said vehicle body, and the weight of said body causes said ground effect producing means to retract.

11. The invention as defined according to claim 10 but further characterized by means yieldingly urging each of said ground effect means to an extended position.

12. A rocket propelled vehicle comprising:
  (a) a plurality of spaced ground effect producing means mounted on said vehicle and operable to produce ground effects blasts at locations outwardly of the main body portion of said vehicle;
  (b) sensing means for measurably sensing the amount of lift produced by each of said ground effect producing means;
  (c) and comparison means for comparing the amount of lift of the ground effect producing means as sensed by said sensing means.

13. The invention as defined in claim 12 but further characterized by actuating means responsive to a predetermined output level of said comparison means for increasing the thrust of the rocket engine of the vehicle.

14. The invention as defined according to claim 12 but further characterized by said ground effect producing means being located at equally spaced intervals around the body of said vehicle, and means for extending each of said ground effect producing means from normally retracted positions to positions outward of, and substantially aft of, the nozzle of said vehicle.

15. The invention as defined according to claim 14 but further characterized by locking means for locking each of said ground effect producing means into retracted positions.

16. The invention as defined according to claim 15 including means for yieldingly urging each of said ground effect producing means to said extended positions.

17. A rocket propelled vehicle capable of making a soft landing comprising:

(a) a plurality of opposed pairs of radially outwardly and aftwardly extensible and retractible ground effect producing means mounted on the body of said vehicle, each of said ground effect producing means when extended being substantially aftward of the plane as the rocket discharge exhaust nozzle of said vehicle for providing additional landing stability for said vehicle during nozzle-first landing maneuvers;

(b) sensing means for measurably sensing the amount of lift produced by each of said ground effect producing means;

(c) and comparison means for comparing the amount of lift produced by each opposed pair of said ground effect producing means;

(d) whereby when said vehicle in a landing maneuver is brought nozzle-first into close proximity to a surface, and the compared difference between the amount of lift produced by each opposed pair of ground effect producing means does not exceed a predetermined level at any time during the landing maneuver, the landing may be completed.

References Cited in the file of this patent

UNITED STATES PATENTS

| | | |
|---|---|---|
| 2,408,099 | Sherman | Sept. 24, 1946 |
| 2,846,164 | Haberkorn | Aug. 5, 1958 |
| 2,971,724 | Zborowski | Feb. 14, 1961 |

FOREIGN PATENTS

| | | |
|---|---|---|
| 1,238,499 | France | July 4, 1960 |